UNITED STATES PATENT OFFICE.

FRIEDRICH AUGUST GASCH, OF HÖNNINGEN-ON-THE-RHINE, GERMANY.

PROCESS OF OBTAINING ZINC SOLUTIONS FREE FROM IRON AND MANGANESE COMPOUNDS.

SPECIFICATION forming part of Letters Patent No. 682,794, dated September 17, 1901.

Application filed December 19, 1899. Serial No. 740,890. (No specimens.)

*To all whom it may concern:*

Be it known that I, FRIEDRICH AUGUST GASCH, a subject of the King of Prussia, German Emperor, residing at Hönningen-on-the-Rhine, Prussia, in the Empire of Germany, have invented certain new and useful Improvements in Processes of Obtaining Zinc Solutions Free from Iron and Manganese Compounds, (for which I have applied for patents in England, No. 21,871, dated November 1, 1899; in France, dated September 30, 1899; in Belgium, dated September 29, 1899; in Italy, dated October 29, 1899; in Sweden, dated September 26, 1899; in Norway, dated September 30, 1899; in Austria, dated September 25, 1899; in Hungary, dated October 11, 1899, and in Germany, dated May 29, 1899,) of which the following is a specification.

This invention relates to a process for preparing zinc solutions free from iron and manganese compounds and at the same time making zinciferous roasted pyrites, by which I mean pyrites from which the sulfur has been roasted out, profitably useful.

Hitherto the purification of zinc solutions has been effected by adding to the moderately strong solution chlorid-of-lime solution until all the iron and manganese are precipitated. The precipitate is so bulky that mere settling is of no use, and a filter-press has to be employed. Moreover, the precipitate carries with it much zinc, which is thereby lost. By the present invention the roasted pyrites is ground to fragments of about one to two millimeters diameter and intimately mixed with the quantity of sulfuric acid, of specific gravity 60° Baumé, equivalent to the zinc present. This mixture is allowed to remain in heaps for one to two days, and the product is heated for five to six hours in a reverberatory furnace or a muffle-furnace at a low red heat. After it has been withdrawn from the furnace and while it is still nearly red-hot the material is mixed with a certain proportion of a mixture Chile saltpeter or another suitable oxidizing agent and caustic lime. By this means the ferrous and manganese compounds present are peroxidized and remain undissolved, being precipitated by the caustic lime, when the material is leached with hot water. The following equations represent this oxidation and precipitation:

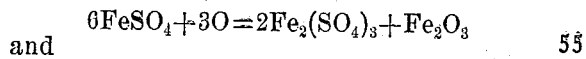

and

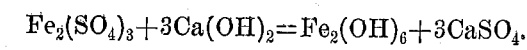

Concentrated sulfuric acid is used in this process because it attacks the iron of the roasted pyrites but little, whereas the dilute acid which has been used in other processes easily dissolves the iron.

The process, first, enables zinciferous roasted pyrites to be purified until it contains less than one per cent. of zinc, so that it is salable as an iron ore; second, doubles the yield of the furnaces, thus reducing the cost for coal and labor, and, third, yields directly a zinc solution free from iron and manganese compounds, such as is applicable in some manufacturing processes, without further purification.

Instead of concentrated sulfuric acid mixed with common salt a mixture of ferrous chlorid and concentrated hydrochloric acid may be used.

What I claim, and desire to secure by Letters Patent of the United States, is—

1. The process of obtaining zinc solutions substantially free from iron and manganese, which consists in treating zinciferous roasted pyrites with a strong acid and roasting the product resulting therefrom, and mixing it while still hot with a suitable oxidizing agent and finally leaching the mixture, substantially as set forth.

2. The process of obtaining zinc solutions substantially free from iron and manganese, which consists in treating zinciferous roasted pyrites with concentrated sulfuric acid and roasting the product resulting therefrom at about a temperature of 400° centigrade, and mixing it while still hot with a suitable oxidizing agent and finally leaching the mixture, substantially as set forth.

In testimony whereof I have hereunto set my hand in the presence of two witnesses.

FRIEDRICH AUGUST GASCH.

Witnesses:
HEINRICH GUGGENHEIMER,
THERESE ETTL.